(12) United States Patent
Rickis et al.

(10) Patent No.: US 10,480,415 B2
(45) Date of Patent: Nov. 19, 2019

(54) HIGH PRESSURE RELIEF VALVE NOZZLE

(71) Applicant: Hamilton Sundstrand Corporation, Windsor Locks, CT (US)

(72) Inventors: Aaron Rickis, Feeding Hills, MA (US); Francis P. Marocchini, Somers, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 27 days.

(21) Appl. No.: 15/802,656

(22) Filed: Nov. 3, 2017

(65) Prior Publication Data

US 2018/0066589 A1    Mar. 8, 2018

Related U.S. Application Data

(62) Division of application No. 13/658,113, filed on Oct. 23, 2012, now Pat. No. 9,856,794.

(51) Int. Cl.
*F02C 7/232* (2006.01)

(52) U.S. Cl.
CPC ........ *F02C 7/232* (2013.01); *F05D 2260/606* (2013.01); *Y10T 137/7837* (2015.04)

(58) Field of Classification Search
CPC ..... F02C 7/232; F05D 2260/606; F16K 17/04
See application file for complete search history.

(56) References Cited

U.S. PATENT DOCUMENTS

| | | | |
|---|---|---|---|
| 4,607,421 A | 8/1986 | Zemek et al. |
| 5,116,362 A | 5/1992 | Arline et al. |
| 5,896,737 A | 4/1999 | Dyer |
| 6,068,022 A | 5/2000 | Schultz et al. |
| 6,651,441 B2 | 11/2003 | Reuter et al. |
| 6,666,015 B2 | 12/2003 | Dyer |
| 8,234,875 B2 | 8/2012 | Falke et al. |
| 2011/0284092 A1 | 11/2011 | Spencer et al. |
| 2012/0167594 A1 | 7/2012 | Poisson et al. |
| 2012/0167992 A1 | 7/2012 | Krithivasan |

*Primary Examiner* — P. Macade Nichols
(74) *Attorney, Agent, or Firm* — Carlson, Gaskey & Olds, P.C.

(57) ABSTRACT

A high pressure relief valve includes a nozzle that is received within an internal bore of a valve housing. The nozzle has a nozzle body with a bore defined by an outlet bore inner diameter that is less than an inlet bore inner diameter. The nozzle body has a nozzle face defined at the outlet end, and is defined between the outlet bore inner diameter and an outlet bore outer diameter spaced radially outwardly of the outlet bore inner diameter. The nozzle body includes a coupling feature held fixed relative to the nozzle body such that the coupling feature is not moveable relative to the nozzle body. The coupling feature is configured to couple the nozzle body to the closure sleeve that surrounds the outlet end. At least one retaining feature prevents the coupling feature from being uncoupled from the closure sleeve.

18 Claims, 9 Drawing Sheets

HIGH PRESSURE RELIEF VALVE NOZZLE

CROSS-REFERENCE TO RELATED APPLICATION

This application is a divisional of U.S. patent application Ser. No. 13/658,113, filed Oct. 23, 2012.

BACKGROUND OF THE INVENTION

This application relates to a high pressure relief valve which may be utilized in a fuel control for an aircraft engine.

A fuel system provides fuel to various portions of a gas turbine engine. The fuel system includes a fuel pump and a High Pressure Relief Valve (HPRV) that supplies fuel to the gas turbine engine.

Should the fuel system experience a blockage, pressure will build up in the system. The HPRV allows fuel pressure to be relieved from a location downstream of the pump, with the fuel then being returned to a pump inlet. The HPRV is essential to safe operation of a fuel pumping unit and is designed to relieve excessive pressure and prevent catastrophic failure of the fuel pump and main housing. The existing high pressure relief valves may sometimes result in undesirably high pressure losses.

Performance of the HPRV is critical to seamless operation of the fuel delivery system.

SUMMARY OF THE INVENTION

A high pressure relief valve includes a valve housing defining an internal bore and having a valve inlet configured to be in fluid communication with a pump outlet. A closure sleeve is at least partially received within the internal bore. The closure sleeve includes a sleeve body surrounding a center axis. The sleeve body has an internal cavity that is enclosed at the downstream end and open at the upstream end. A piston is received within the internal cavity. The internal cavity is defined in part by a piston contact surface that is defined by an inner diameter. The piston contact surface slides against an outer surface of the piston. A nozzle is received within the internal bore of the valve housing, and includes a nozzle body surrounding a center axis and defined by an overall length extending from an inlet end to an outlet end. The nozzle body has a nozzle bore defined by an outlet bore inner diameter at the outlet end and an inlet bore inner diameter at the inlet end. The inlet bore inner diameter is greater than the outlet bore inner diameter. The nozzle body has a nozzle face defined at the outlet end, and is defined between the outlet bore inner diameter and an outlet bore outer diameter spaced radially outwardly of the outlet bore inner diameter. The nozzle body includes a coupling feature held fixed relative to the nozzle body such that the coupling feature is not moveable relative to the nozzle body. The coupling feature is configured to couple the nozzle body to the closure sleeve that surrounds the outlet end. At least one retaining feature prevents the coupling feature from being uncoupled from the closure sleeve. A spring assembly biases the piston to close the outlet end. When a system pressure at the nozzle outlet exceeds a predetermined pressure level, a spring biasing load is overcome to open the outlet end to fluidly connect the nozzle to the internal cavity of the closure sleeve. The nozzle includes one or more of the following nozzle characteristics: a ratio of the outlet bore inner diameter to the outlet bore outer diameter at the nozzle face is between 0.95 and 0.98; a ratio of the outlet inner bore diameter at the nozzle face to the overall length is between 0.30 and 0.25; the nozzle bore includes at least a first bore section defined by a first bore length and a generally constant bore diameter that corresponds to the outlet bore inner diameter, and wherein the nozzle bore includes a second bore section defined by a second bore length and a variable bore diameter, and wherein a ratio of the outlet bore inner diameter at the nozzle face to the first bore length is between 0.8 and 1.1; or the second bore section increases in diameter along the second bore section length from an end of the first bore section to the inlet bore inner diameter such that the second bore section is defined by a conical surface angle, and wherein the conical surface angle of the nozzle is within a range between 0 degrees and 25 degrees.

A fuel supply system and a method of replacing a component in a high pressure relief valve are also disclosed.

These and other features may be best understood from the following drawings and specification.

DETAILED DESCRIPTION

Figure 1:
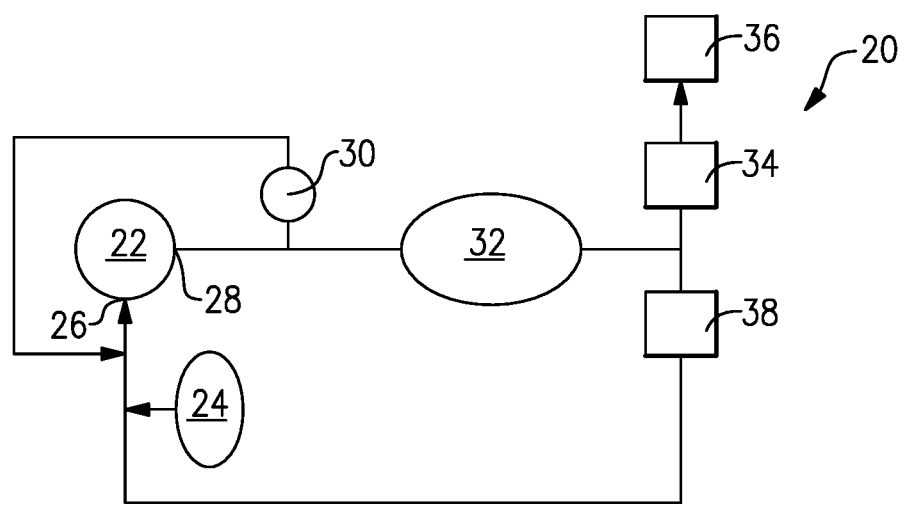
FIG. 1 shows a schematic view of a fuel system for an aircraft.

FIG. 1 shows a schematic view of an aircraft fuel supply system 20 having a fuel pump 22 drawing fuel from a fuel supply 24. The pump 22 has a pump inlet 26 in fluid communication with the fuel supply 24 and a pump outlet 28 is in fluid communication with a high pressure relief valve (HPRV) 30. During normal operating conditions the HPRV 30 remains closed and the fuel passes through a filter to remove contaminants. Fuel exiting the filter is then directed to fuel metering system 32 with a fuel metering valve 34 to supply fuel to an engine 36. If the supply of fuel at the fuel metering system 32 is excessive for the current engine operating condition the excess fuel is ported back to the pump inlet 26.

The HPRV 30 is positioned immediately downstream of the pump outlet 28. Should the system 20 become clogged or blocked, the pressure will become undesirably high, which could result in damage to the pump 22 or pump housing 36. The HPRV 30 will automatically open once a specified pressure level is exceeded to allow fuel to return to the pump inlet 26.

Figure 2:
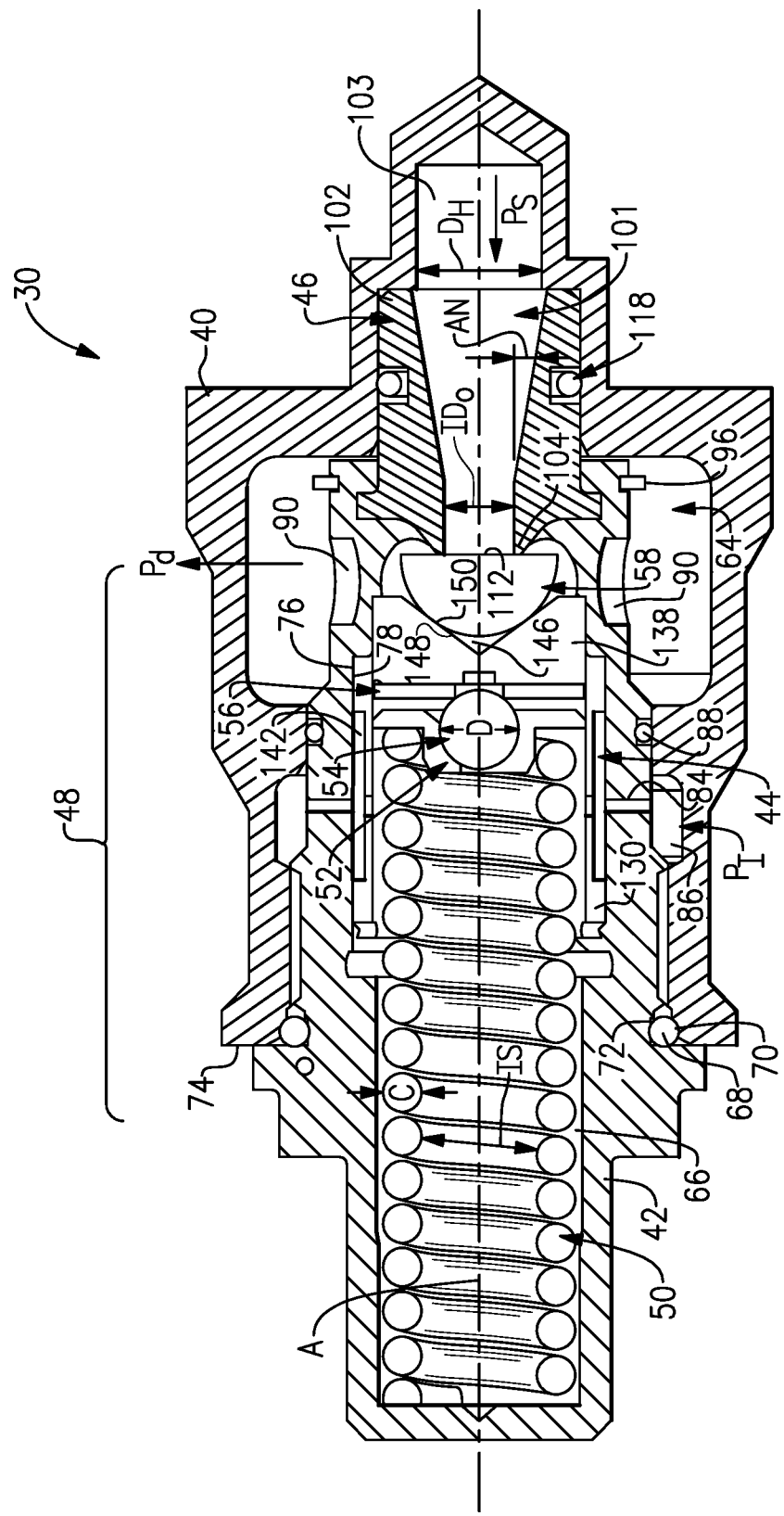
FIG. 2 is a cross-sectional view of the high pressure relief valve of FIG. 1.

A cross-sectional view of the HPRV 30 is shown in FIG. 2. The HPRV 30 is comprised of a valve housing 40 aligned longitudinally along a valve center axis A, a closure sleeve 42 received within the valve housing 40, a piston 44 received within the closure sleeve 42, a nozzle 46, and a spring assembly 48 that biases the HPRV 30 to the closed position. The spring assembly 48 includes a spring 50, a spring seat 52, a ball 54, and a washer or disc 56. A half ball 58 is positioned axially between one end of the piston 44 and the nozzle 46.

Figure 3:
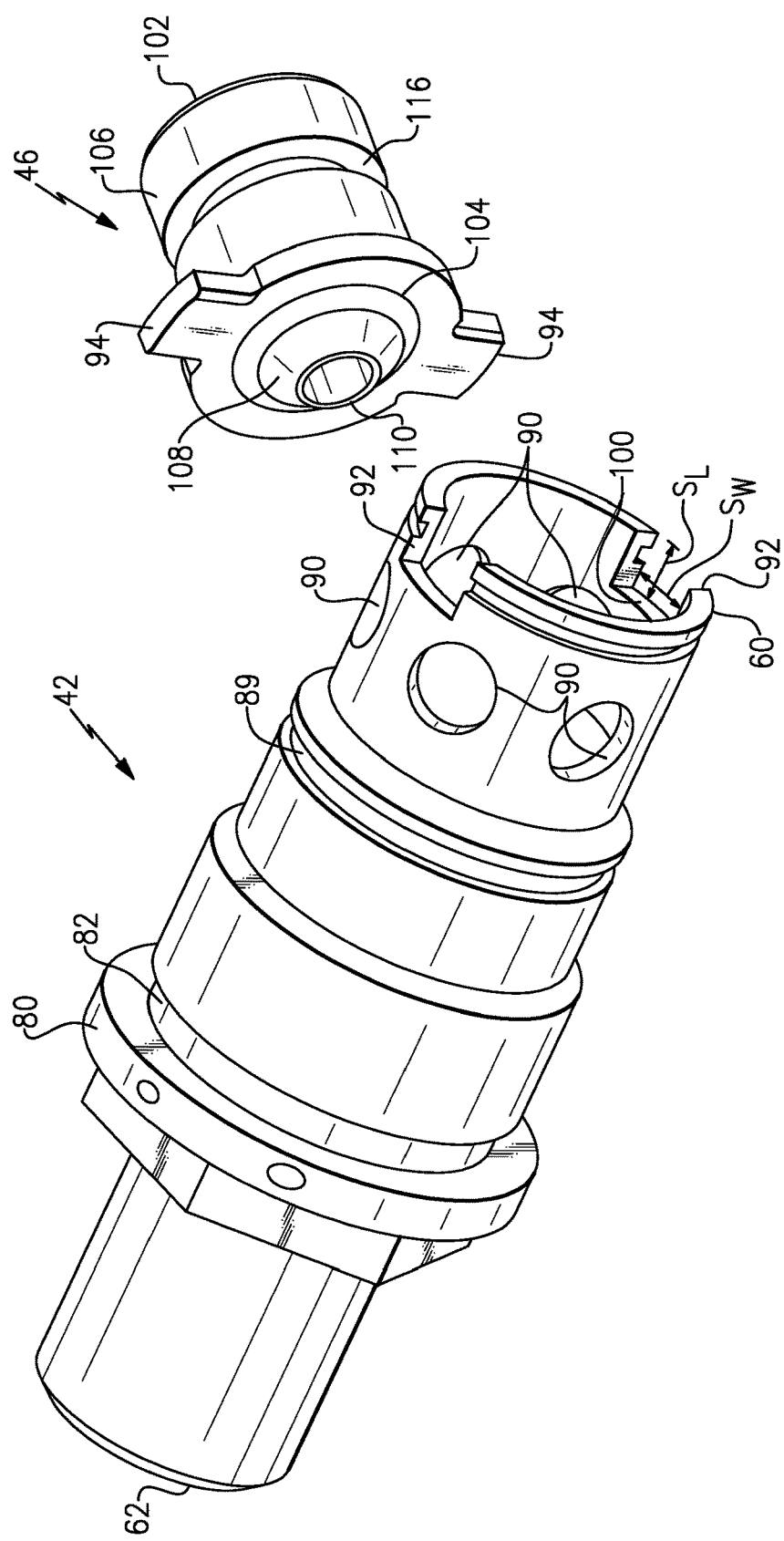
FIG. 3 a perspective view of the closure sleeve and nozzle from the high pressure relief valve of FIG. 2.
Figure 4:
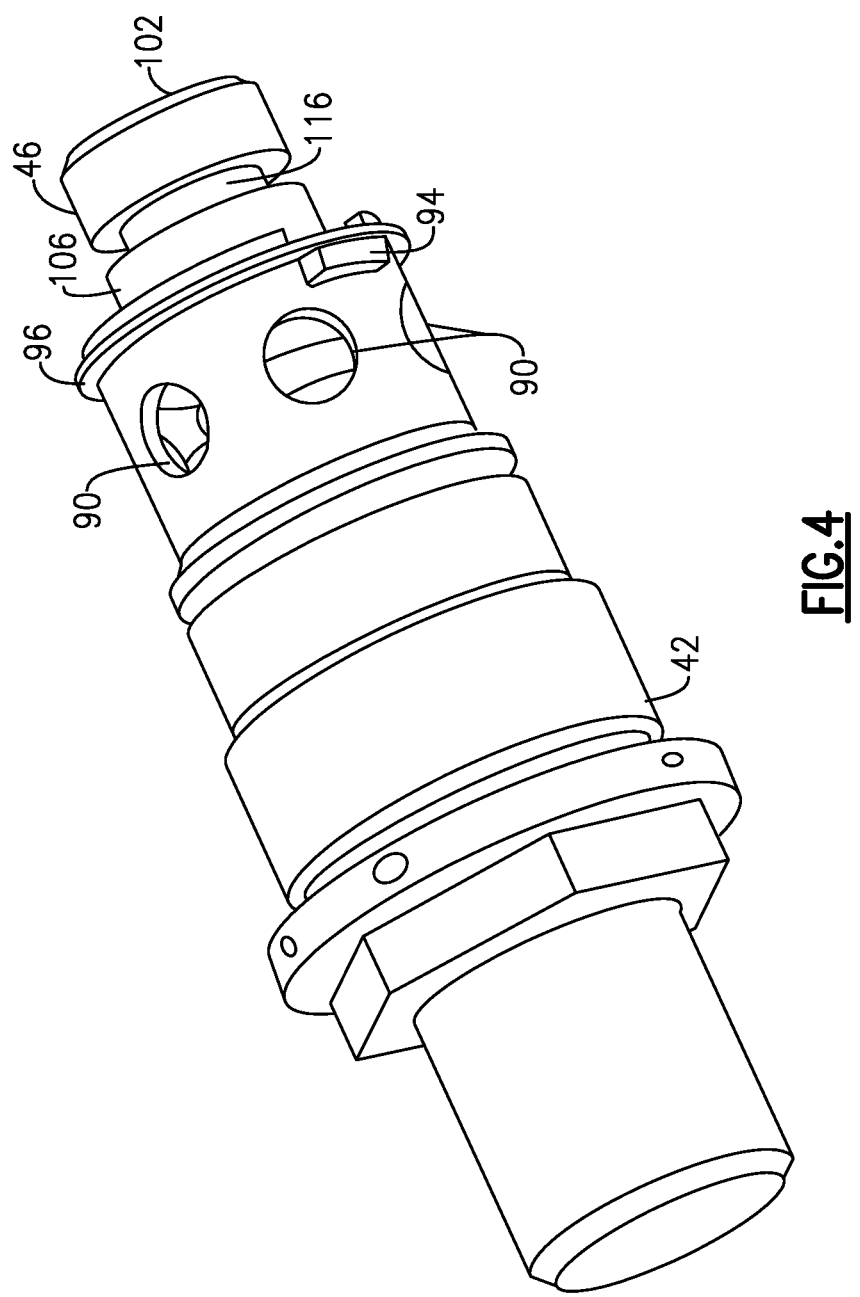
FIG. 4 is an assembled view for the components of FIG. 3.
Figure 5:
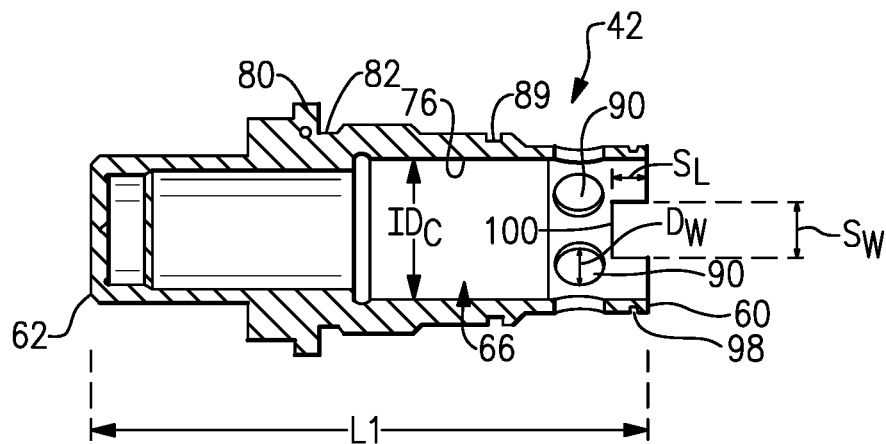
FIG. 5 is a section view through the closure sleeve.

The closure sleeve 42 and nozzle 46 are shown in greater detail in FIGS. 3-5. The closure sleeve 42 comprises a one-piece component that is configured to include a HPRV assembly with the HPRV 30 while also providing an end cap closure. This configuration reduces the overall number of components for the HPRV 30.

As shown in FIG. 3, the closure sleeve 42 has an upstream end 60 and a downstream end 62. The upstream end 60 is received within an internal bore or cavity 64 (FIG. 2) of the valve housing 40 and the downstream end 62 extends outwardly of the valve housing 40. The closure sleeve 42 defines an internal cavity 66 (FIG. 5) within which the spring assembly 48 and piston 44 are received. The downstream end 62 of the closure sleeve 42 is enclosed such that when the closure sleeve 42 is mounted within the valve housing 40, the HPRV 30 is sealed. As shown in FIG. 2, a seal 68 is positioned radially between an inner surface 70 of the valve housing 40 and an outer surface 72 of the closure sleeve 42 at a downstream end 74 of the valve housing 40 to ensure that the internal cavities 64, 66 are sealed from leaking externally.

Figure 9:
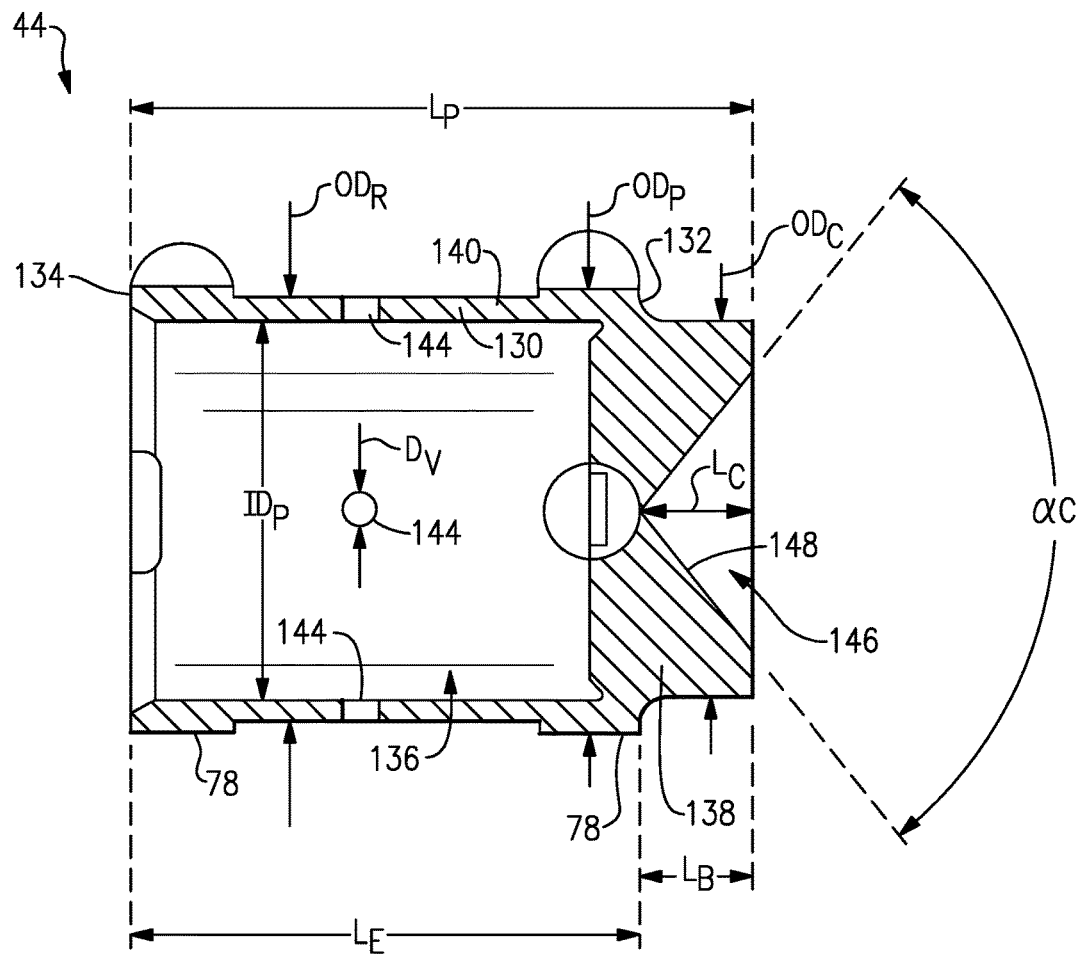
FIG. 9 is a section view through a piston of the high pressure relief valve of FIG. 2.

As shown in FIG. 5, the internal cavity 66 is defined in part by an inner surface 76 that directly abuts against an outer surface 78 of the piston 44 in a sliding relationship. The inner surface 76 of the closure sleeve 42 is defined by an inner diameter $ID_C$ and a piston engagement sleeve length $L_1$ (FIG. 5). The outer surface 78 of the piston 44 is defined by an outer diameter $OD_P$ (FIG. 9). The outer diameter $OD_P$ comprises the maximum outer diameter of the piston 44. As shown in FIG. 5, the flange 80 extends radially outwardly of the closure sleeve 42, which abuts against the downstream end 74 of the valve housing 40 (FIG. 2). A notch or groove 82 is formed within the outer surface of the closure sleeve 42 immediately upstream of the flange 80. The seal 68 (FIG. 1) is received within the groove 82.

The closure sleeve 42 includes one or more vent or damping orifices 84 (FIG. 6) that extend through a thickness of the closure sleeve 42 from the inner surface to the outer surface of closure sleeve 42. The damping orifice 84 is defined by a diameter $D_D$. The damping orifice 84 is in fluid communication with an annulus 86 (FIG. 2) that is formed radially between the closure sleeve 42 and the valve housing 40. The annulus 86 is in fluid communication with a separate pressure input $P_I$. The damping orifice 84 facilitates slowing down, i.e. controlling how fast the valve can move. A seal 88 (FIG. 2) is positioned radially between the valve housing 40 and the closure sleeve 42. The seal 88 is seated within a notch 89 (FIG. 5) formed within the closure sleeve 42. This seal 88 allows the pressure input $P_I$ to be independent of the pressure outlet $P_d$. The internal cavity 66 of the closure sleeve 42 comprises a spring cavity that receives the spring assembly 48. Pressure within the spring cavity is the same as the pressure input $P_I$.

The closure sleeve 42 includes a plurality of windows 90 (FIG. 3) that are circumferentially spaced apart from each other about the closure sleeve 42 adjacent the upstream end 60. Each window 90 is defined by a window diameter $D_w$ (FIG. 5). The windows 90 are in fluid communication with the internal cavity 64 (FIG. 2) of the valve housing 40 at the pressure outlet Pd. Once system pressure $P_S$ is greater than the biasing force of the spring assembly 48 (spring load) plus the spring cavity pressure, the half ball 58 is unseated from the nozzle 46 and the spring assembly 48 moves to the left, i.e. downstream, which allows fluid to flow through the windows 90 and exit the pressure outlet $P_d$. The exiting fluid is then returned to the pump inlet 26.

Figure 6:
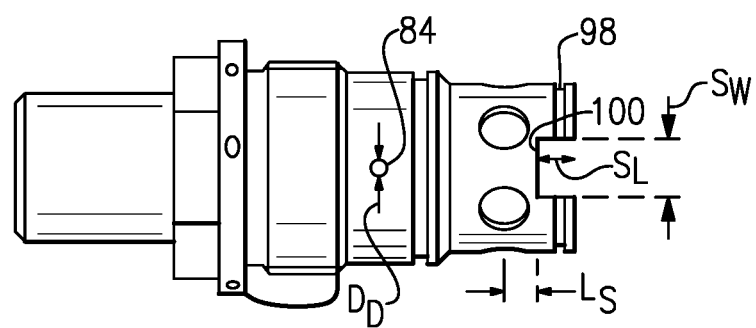
FIG. 6 is a side view of the closure sleeve.

The closure sleeve 42 also includes a pair of slots 92 (FIG. 3) formed in the upstream end 60. In one example, the slots 92 are spaced one hundred and eighty degrees apart from each other. The slots 92 are defined by a slot width $S_W$ and a slot depth or length $S_L$ (FIGS. 5-6). The slots 92 receive corresponding tabs 94 (FIGS. 3 and 7) that are on the nozzle 46 as best shown in FIG. 4. After the tabs 94 are inserted into the slots 92 a snap ring 96 fits in a groove 98 in the closure sleeve 42 to prevent the closure sleeve 42 and nozzle 46 from separating from each other. The snap ring 96 is shown positioned externally on the closure sleeve 42 for this configuration; however, it can also be incorporated on an inner diameter ID of the closure sleeve 42 to achieve the same retention of the nozzle 46.

The inner diameter that defines the internal cavity 66 of the closure sleeve 42 is sized to accommodate the HPRV spring assembly 48. The outer diameter that defines the outer surface of the closure sleeve 42 is sized, relative to the bore (internal cavity 64) of the valve housing 40, to minimize pressure drop in the bore of the valve housing 40. The closure sleeve 42, thus, optimizes flow through the HPRV 30 while also providing containment of valve components in a cartridge type design. The windows 90 are configured to minimize pressure drop through the HPRV 30 while regulating the pressure acting on the piston 44. The windows are also positioned to minimize hydraulic side loading of the piston 44.

In one embodiment, the inner diameter $ID_C$ of the closure sleeve 42 at the engagement surface with the piston 44 is 1.0 inches (2.54 centimeters) and the interface length $L_1$ of the closure sleeve 42 is 1.3 inches (3.30 centimeters). In embodiments, a ratio of the interface length $L_1$ to the inner diameter IDc is between 1.0 and 1.5.

In one embodiment, the closure sleeve 42 has a slot width $S_W$ of 0.4 inches (1.02 centimeters) and the inner diameter $ID_C$ is 1.0 inches (2.54 centimeters). In embodiments, a ratio of the slot width $S_W$ to the inner diameter $ID_C$ is between 0.1 and 0.6.

The slot length $S_L$ is 0.25 inches (0.635 cm) and a slot width $S_W$ is 0.4 inches (1.02 centimeters). A ratio of slot width $S_W$ to slot length $S_L$ is between 1.0 and 2.5. In one embodiment, the window diameter $D_W$ is 0.35 inches (0.89 centimeters) and the outer diameter $OD_P$ of the piston 44 at the engagement surface to the sleeve 42 is 1.0 inches (2.54 centimeters). In embodiments, a ratio of the window diameter $D_W$ to the outer diameter $OD_P$ of the piston 44 is between 0.3 and 0.5.

In one embodiment, the diameter $D_D$ of damping orifice 84 is 0.032 inches (0.08 centimeters) and the inner diameter $ID_C$ is 1.0 inches (2.54 centimeters). In embodiments, a ratio of the diameter $D_D$ of the damping orifice 84 to the inner diameter $ID_C$ is between 0.020 and 0.050.

In one embodiment, a length $L_x$ from a center of the windows 90 to a depth face 100 of the slot 92 is within the range of 0.09 inches (0.23 centimeters) to 0.44 inches (1.12 centimeters).

Figure 7:
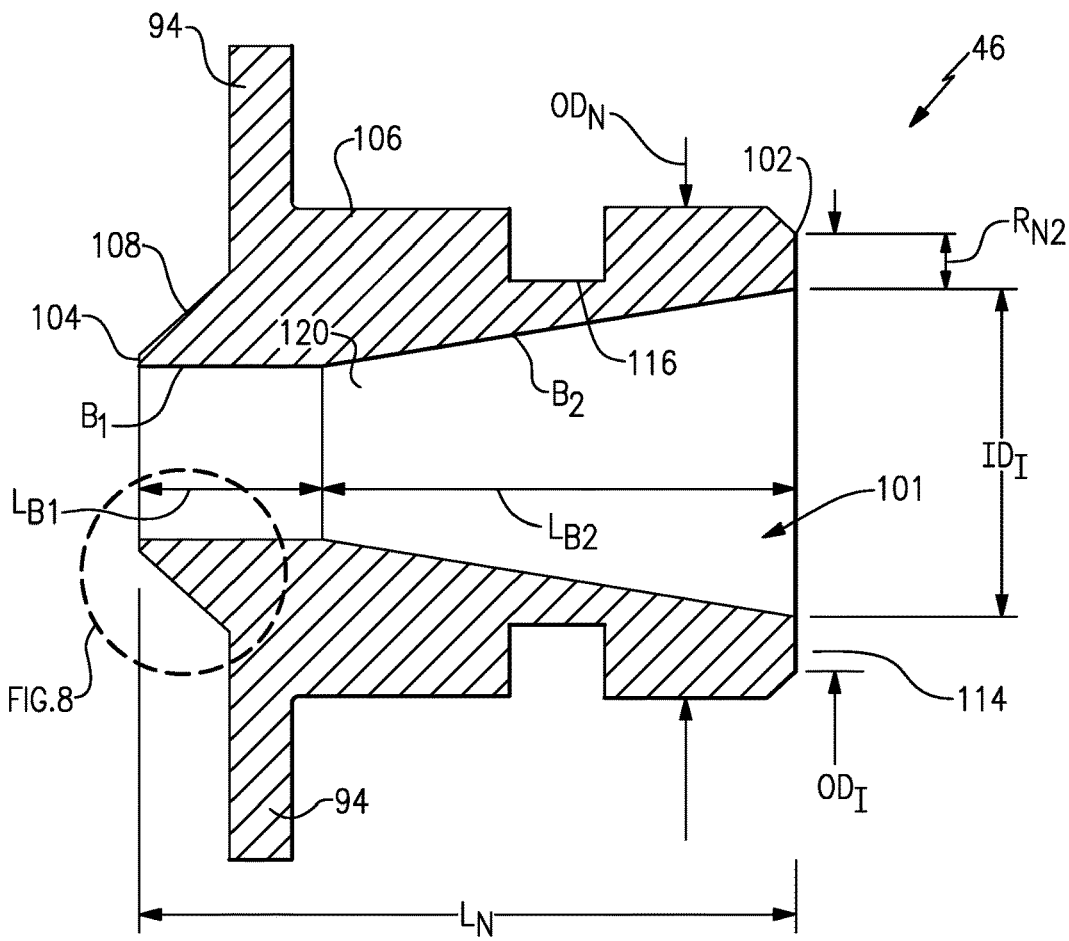
FIG. 7 is a section view through the nozzle of FIG. 3.

The nozzle 46 is shown in greater detail in FIGS. 3-4 and 7. The nozzle 46 controls the inlet flow and balances momentum forces against the spring load. The nozzle 46 includes a nozzle bore 101 (FIG. 7) that extends from an inlet end 102 to an outlet end 104. The nozzle 46 is defined by an overall nozzle length $L_N$ that extends from the inlet end 102 to the outlet end 104. The inlet end 102 is in fluid communication with an inlet bore 103 (FIG. 2) of the valve housing 40 that receives fluid at the system pressure $P_S$.

The nozzle 46 is defined by an outer surface 106 that extends from the inlet end 102 to an upstream side of the tabs 94. This outer surface 106 is defined by a generally constant nozzle outer diameter $OD_N$. The tabs 94 are defined by a tab outer diameter that is greater than the nozzle outer diameter $OD_N$. The nozzle 46 also includes a tapering outer surface portion 108 that extends from a downstream side of the tabs 94 to the outlet end 104.

Figure 8:
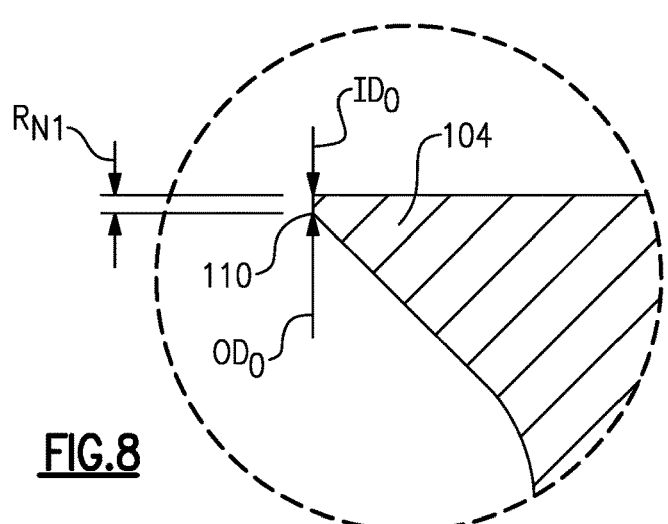
FIG. 8 is a magnified view of a nozzle face as identified in FIG. 7.

The outlet end 104 provides an outlet end face 110 (FIG. 8), i.e. nozzle face, that is defined by an outlet outer diameter $OD_O$ and an outlet inner diameter $ID_O$ that are radially spaced apart from each other by a radial distance $R_{N1}$ (FIG. 8) to define an annular thickness at the outlet end face 110. The annular outlet end face 110 contacts a generally flat end face 112 of the half ball 58 when the HPRV 30 is in the closed position.

The inlet end 102 of the nozzle 46 provides an inlet end face 114 (FIG. 7) that is defined by an inlet outer diameter $OD_1$ and an inlet inner diameter $ID_I$ that are radially spaced apart from each other by a radial distance $R_{N2}$ to define an annular inlet end face 114. The inlet inner diameter $ID_I$ is greater than an inner diameter $D_H$ of the valve housing 40 at the inlet bore 103. This configuration prevents pressure loss at this location.

The outer surface 106 of the nozzle 46 includes a groove 116 that receives a seal with slipper 118 (FIG. 2). This seal is provides sealing between the valve housing 40 and the nozzle 46.

The nozzle bore 101 includes at least a first bore section B1 (FIG. 7) and a second portion section $B_2$. The first bore section $B_1$ is defined by a generally constant diameter (corresponding to the outlet inner diameter $ID_O$) that extends along a first bore section length $L_{B1}$. The first bore section length $L_{B1}$ extends from the outlet end face 110 to a position 120 within the nozzle bore 101. In one example, the position 120 is located upstream of the tabs 94.

The second bore section $B_2$ comprises a conical section that has a variable diameter. The second bore section $B_2$ is defined by a second bore section length $L_{B2}$ that extends from the position 120 to the inlet end face 114. The second bore section $B_2$ has a smallest diameter (corresponding to the outlet inner diameter $ID_O$) at the position 120 and a largest diameter (corresponding to the inlet inner diameter $ID_I$) at the inlet end face 114. The second bore section $B_2$ increases in diameter in a generally constant manner from the position 120 to the inlet end face 114 such that the second bore section is defined by a conical surface angle $A_N$.

In one embodiment, at the nozzle face, i.e. the outlet end face 110, the nozzle 46 has an outlet inner diameter $ID_O$ that is 0.280 inches (0.711 centimeters) and an outlet outer diameter $OD_O$ that is 0.297 inches (0.754 centimeters). In embodiments, a ratio of the outlet inner diameter $ID_O$ to the outlet outer diameter $OD_O$ is between 0.95 and 0.98.

In one embodiment, the outlet inner diameter $ID_O$ is 0.280 inches (0.711 centimeters) and the first bore section length $L_{B1}$ is 0.290 inches (0.737 centimeters). The ratio of the outlet inner diameter $ID_O$ at the nozzle face to the first bore section length $L_{B1}$ is between 0.80 and 1.10.

In one embodiment, the outlet inner diameter $ID_O$ is 0.280 inches (0.711 centimeters) and the overall nozzle length $L_N$ is 1.055 inches (2.680 centimeters). The ratio of the outlet inner diameter $ID_O$ at the nozzle face to the overall nozzle length $L_N$ is between 0.30 and 0.25.

In one embodiment, the conical surface angle $A_N$ of the nozzle 46 is within a range between 0 degrees and 25 degrees.

The nozzle 46 is sized to handle the required flow while meeting system requirements for performance. The nozzle 46 is configured to reduce pressure drop, off-centered flow, and flow swirling. The larger diameter at the inlet to the nozzle is sized to align with the valve housing inlet plumbing line. The smaller nozzle diameter is sized to balance momentum loads to minimize valve droop. The nozzle length is sized to allow a 20 degrees transition "cone" from the plumb line inlet diameter to the smaller nozzle outlet diameter. In one example, the smaller nozzle diameter, i.e. the outlet inner diameter $ID_O$, is sized to maintain a diameter to length ratio of 1.0.

Figure 10:
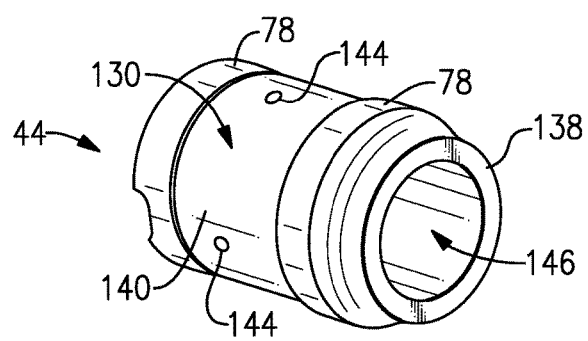
FIG. 10 is a perspective view of the piston.

The piston 44 is shown in greater detail in FIGS. 9-10. The piston 44 comprises a cylindrical body portion 130 with an upstream end 132 and a downstream end 134. A piston bore 136 is formed within the cylindrical body portion 130 to receive the spring assembly 48 (FIG. 2). The bore is defined by an inner diameter $ID_P$. A boss portion 138 is formed at the upstream end 132 to serve as a seat for the half ball 58 (FIG. 2). The boss portion 138 encloses one end of the piston bore 136 leaving the opposite end open to receive the spring assembly 48.

The piston 44 has a maximum outer diameter $OD_P$ which forms the outer surface 78 that abuts against the closure sleeve 42. One portion of this abutment surface 78 is formed at the downstream end 134 and another portion of this abutment surface 78 is formed at the upstream end 132. These two portions are axially separated from each other by an undercut portion having an outer surface 140 that is defined by an outer diameter $OD_R$ that is less than the maximum outer diameter $OD_P$. This outer surface 140 is spaced radially inwardly of an inner surface of the closure sleeve 42 to form an annulus 142 between the sleeve 42 and piston 44 (FIG. 2).

One or more vent windows 144 (FIG. 9) are formed within the piston 44. The vent windows are defined by a vent diameter $D_V$ and extend through a thickness of the piston 44 from the outer surface 140 to the piston bore 136. The vent windows 144 fluidly connect the spring cavity 66 with the annulus 142 (FIG. 2). The annulus 142 is in fluid communication with the damping orifice 84 formed in the closure sleeve 42, which is in fluid communication with the annulus 86. The vent windows 144 are sized based on the size of the damping orifice 84 in the closure sleeve 42. The vent windows 144, annulus 142, damping orifice 84, and annulus 86 cooperate with each other to control movement of the valve to reduce pressure losses.

The piston 44 is defined by an overall length $L_P$, the cylindrical body portion 130 is defined by a length $L_E$, and the boss portion 138 is defined by a length $L_B$. The boss portion 138 includes a conical opening 146 (FIG. 9) that is defined by a conical surface 148 that serves as a seat for the half ball 58. The conical surface 148 is defined by a conical angle $\alpha_c$. The depth of the conical opening 146 from the apex of the conical surface 148 to the end face of the boss portion 138 is defined by a length $L_C$.

As shown in FIG. 2, the half ball 58 is semi-hemispherical in shape and has a substantially flat surface 112 that faces the nozzle 46 and a spherical surface 150 that sits in the conical opening 146. The spherical surface 150 cooperates with the conical surface 148 to allow pivoting movement of the hall ball 58 such that the nozzle face can be fully sealed in the closed position even if the piston and nozzle are not fully in axial alignment with each other.

In one embodiment, the length $L_E$ of the cylindrical body portion 130 that includes the outer surface portions 78, 140 is 1.13 (2.870 centimeters) and the maximum outer diameter $OD_P$ is 1.00 inches (2.54 centimeters). The ratio of the length $L_E$ of the cylindrical body portion 130 to the maximum outer diameter $OD_P$ is between 1.0 and 1.2.

In one embodiment, the damping orifice diameter $D_D$ in the closure sleeve 42 is 0.032 (0.081 centimeters) and the vent window diameter $D_V$ is 0.078 inches (0.198 centimeters). The ratio of the damping orifice diameter $D_D$ to the vent window diameter $D_V$ is between 0.375 and 0.45.

In one embodiment, the outer diameter $OD_R$ of the undercut portion having surface 140 is 0.954 inches (2.423 centimeters) and the maximum outer diameter $OD_P$ is 1.0 inches (2.54 centimeters). The ratio of the outer diameter $OD_R$ of the undercut portion having the surface 140 to the maximum outer diameter $OD_P$ is between 0.8 and 1.0.

In one embodiment, the conical angle $\alpha_c$ of the boss portion 138 is within a range of between 100 degrees and 120 degrees.

In one embodiment, the depth or length $L_C$ of the conical opening 146 in the boss portion 138 is 0.277 inches (0.704 centimeters) and the maximum diameter $OD_C$ of the boss portion 138 with the conical opening 146 is 0.850 inches (2.159 centimeters). The ratio of the length $L_C$ of the conical opening 146 to the maximum diameter $OD_C$ of the boss portion 138 is between 0.3 and 0.4.

As shown in FIG. 2, the piston 44 provides the conical seat for the half ball 58 as well as the pressure area internal to the closure sleeve 42. The seat is sized to hold the half ball 58 and allows for ball rotation. The piston maximum outer diameter $OD_P$ (FIG. 9) is sized for a pressure area to meet valve performance requirements. The internal annulus is sized to provide a ten times area increase over the spring cavity damping orifice 84. The vent windows 144 in the piston 44 are sized to a ten times area increase over the spring cavity damping orifice 84. The number of windows is optimized to vent air in any orientation of the piston 44.

Figure 11:
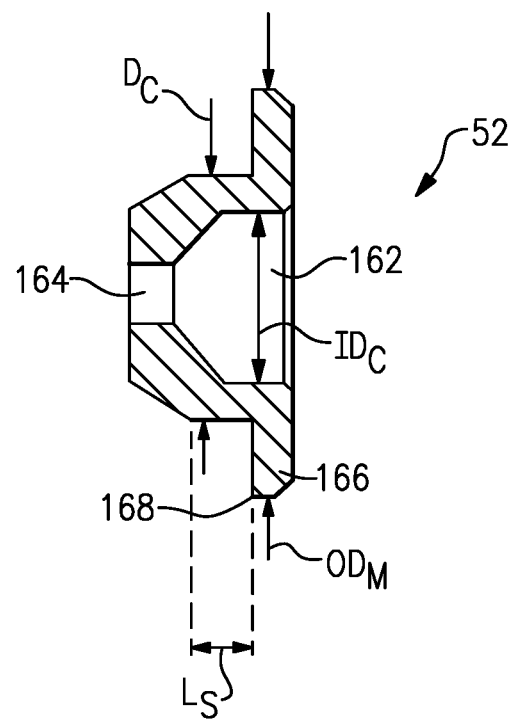
FIG. 11 is a section view of a spring seat of a spring assembly as shown in FIG. 2.
Figure 12:
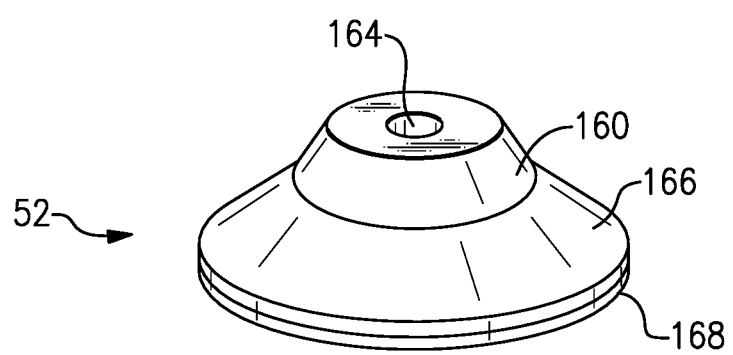
FIG. 12 is a perspective view of the spring seat of FIG. 11.

As discussed above, the spring assembly 48 (FIG. 2) includes the spring seat 52, the ball 54, the disc 56, and the spring 50. The spring seat 52 is shown in greater detail in FIGS. 11-12 and the disc 56 is shown in greater detail in FIGS. 13 and 14. The spring seat 52 comprises a cup-shaped body 160 with a recess 162 for seating the ball 54. The recess 162 is defined by a maximum inner diameter $ID_M$. The ball 54 is defined by a ball diameter D (FIG. 1). The base of the cup-shaped body 160 has an opening 164 into the piston bore 136, and thus is fluidly connected to the spring cavity 66. The cup-shaped portion 160 is defined by a maximum outer cup diameter $D_C$ and a length $L_S$. The opening 164 facilitates seating of the ball 54 within the cup-shaped portion 160.

The spring seat 52 fits within the piston bore 136. The spring seat 52 includes an enlarged flange portion 166 with an outer edge 168 that slides against an inner surface of the piston bore 136. The outer edge 168 is defined by a maximum outer diameter $OD_M$ of the spring seat 52.

Figure 13:
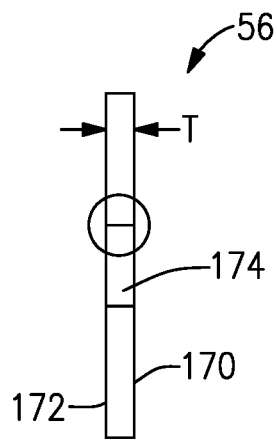
FIG. 13 is a section view of a disc of a spring assembly as shown in FIG. 2.
Figure 14:
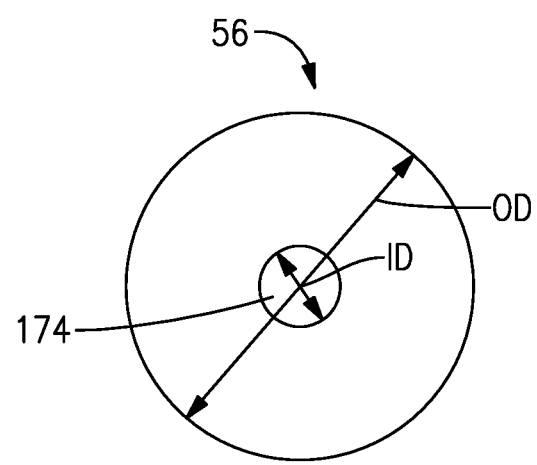
FIG. 14 is an end view of the disc of FIG. 13.

As shown in FIGS. 13-14, the disc 56 has a thickness T that extends from an upstream side 170 to a downstream side 172 of the disc 56. The disc 56 is defined by an outer diameter OD and has a center opening 174 that is defined by an inner diameter ID.

In one example, the piston 44 is made from an aluminum material while the ball 54 is comprised of a steel material. The disc 56 is also comprised of a steel material. The disc 56 is tightly fit within the piston 44 and is positioned axially between an end face of the piston bore 136 and the ball 54 to keep the ball 54 from contacting the piston 44.

As shown in FIG. 2, the spring 50 has a first end 178 that is seated against an end face of the closure sleeve 42 and a second end 180 that is seated against the flange portion 166 of the seat 52. The spring end 180 surrounds the cup-shaped portion 160. The spring 50 is defined by a spring inner diameter IS and a coil diameter C. As known, springs do not always push in a completely straight line. The ball 54 allows the spring seat 52 to rotate around the ball by approximately 8 degrees until the upper or lower edge 168 of the flange portion 166 contacts the disc 56.

In one example, the outer diameter OD of the disc 56 is 0.837 inches (2.126 centimeters) and the inner diameter $ID_P$ of the piston 44 is 0.85 inches (2.159 centimeters). The ratio of the outer diameter OD of the disc 56 to the inner diameter $ID_P$ of the piston 44 is between 0.97 and 0.99.

In one example, the inner diameter ID of the disc 56 is 0.192 inches (0.488 centimeters) and the diameter D of the ball 54 is 0.312 inches (0.792 centimeters). The ratio of the inner diameter ID of the disc 56 to the diameter D of the ball 54 is between 0.60 and 0.95.

In one example, the thickness T of the disc 56 is 0.06 inches (0.152 centimeters) and the outer diameter OD of the disc 56 is 0.837 inches (2.126 centimeters). The ratio of the thickness T of the disc 56 to the outer diameter OD of the disc 56 is between 0.06 and 0.08.

In one example, the inner diameter $ID_M$ of the spring seat 52 is 0.316 inches (0.803 centimeters) and the diameter D of the ball 54 is 0.312 inches (0.792 centimeters). The ratio of inner diameter $ID_M$ of the spring seat 52 to the diameter D of the ball 54 is between 1.01 and 1.10.

In one example, the maximum outer diameter $OD_M$ of the spring seat 52 is 0.710 inches (1.803 centimeters) and the inner diameter $ID_P$ of the piston 44 is 0.85 inches (2.159 centimeters). The ratio of maximum outer diameter $OD_M$ of the spring seat 52 to the inner diameter $ID_P$ of the piston 44 is between 0.8 and 0.9.

In one example, the maximum axial distance between the seat 52 and the disc 56 (FIG. 2) is approximately two times the nominal spacing between the seat 52 and the disc 56. The nominal spacing is shown in FIG. 2 as the axial distance between the seat 52 and disc 56 when both components are aligned with each other. If the upper or lower edge 168 of the seat 52 contacts the disc 56. The furthest distance, i.e. the maximum axial distance, at the non-contacting edge 168 is no more than two times the nominal spacing.

In one example, the maximum length Ls of the cup-shaped portion 160 is 60-100% of a coil diameter of the spring 50.

In one example, the outer diameter Dc of the cup-shaped portion 160 is 0.439 inches (1.115 centimeters) and the inner diameter IS of the spring 50 is 0.459 inches (1.166 centimeters). The ratio of outer diameter Dc of the cup-shaped portion 160 to the inner diameter IS of the spring 50 is between 0.901 and 0.98.

In one example, the outer diameter Dc of the cup-shaped portion 160 is 0.439 inches (1.115 centimeters) and the length $L_S$ of the cup-shaped portion 160 is 0.092 inches (0.234 centimeters). The ratio of outer diameter Dc of the cup-shaped portion 160 to the length $L_S$ of the cup-shaped portion 160 is between 4.0 and 5.0.

The spring assembly 48 serves to remove side-loading from the HPRV 30. The seat 52 is sized to hold the ball 54, with the seat walls being sized to handle the spring loads and ball contact stress. The disc outer diameter OD is sized to align with the piston inner diameter $ID_P$, which reduces shucking of the seat assembly. The disc inner diameter ID is size for the ball size and to accommodate contact stresses. The disc thickness T is sized to ensure that the ball 54 never contacts the piston 44. The ball 54 is sized to fit into the seat 52 while optimizing pivoting and minimizing contact stresses. In one example, the assembly is configured to allow for approximately 8 degrees of rotation.

In a method of replacing a piston 44, nozzle 46, spring assembly 48, or closure sleeve 42 in a HPRV 30, at least one of the piston 44, nozzle 46, spring assembly 48 or closure sleeve 42 is removed from the valve housing 40, and at least one of a replacement piston, nozzle, spring assembly, or closure sleeve replaces the removed piston, nozzle, spring assembly, or closure sleeve. The piston, nozzle, spring assembly, or closure sleeve which is replaced is generally as disclosed above.

With a valve made according to the above description, the pressure losses across the valve are dramatically reduced and the operating is improved when compared to the prior art.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A high pressure relief valve comprising:
   a valve housing defining an internal bore and having a valve inlet configured to be in fluid communication with a pump outlet;
   a closure sleeve at least partially received within the internal bore, the closure sleeve comprising a sleeve body surrounding a center axis, wherein the sleeve body has an internal cavity that is enclosed at a downstream end and open at an upstream end;
   a piston received within the internal cavity, wherein the internal cavity is defined in part by a piston contact surface that is defined by an inner diameter, wherein an outer surface of the piston slides against the piston contact surface;
   a nozzle received within the internal bore of the valve housing, the nozzle comprising a nozzle body surrounding a center axis and defined by an overall length extending from an inlet end to an outlet end, wherein the nozzle body has a nozzle bore defined by an outlet bore inner diameter at the outlet end and an inlet bore inner diameter at the inlet end, the inlet bore inner diameter being greater than the outlet bore inner diameter, and wherein the nozzle body has a nozzle face defined at the outlet end, the nozzle face being defined between the outlet bore inner diameter and an outlet bore outer diameter spaced radially outwardly of the outlet bore inner diameter, and wherein the nozzle body includes a coupling feature held fixed relative to the nozzle body such that the coupling feature is not moveable relative to the nozzle body, and wherein the coupling feature is configured to couple the nozzle body to the closure sleeve that surrounds the outlet end;
   at least one retaining feature that prevents the coupling feature from being uncoupled from the closure sleeve;
   a spring assembly that biases the piston to close the outlet end, and wherein when a system pressure at the nozzle outlet exceeds a predetermined pressure level, a spring biasing load is overcome to open the outlet end to fluidly connect the nozzle to the internal cavity of the closure sleeve; and
   wherein the nozzle includes one or more of the following nozzle characteristics
      wherein a ratio of the outlet bore inner bore diameter to the outlet bore outer diameter at the nozzle face is between 0.95 and 0.98,
   wherein a ratio of the outlet inner bore diameter at the nozzle face to the overall length is between 0.30 and 0.25,
   wherein the nozzle bore includes at least a first bore section defined by a first bore length and a generally constant bore diameter that corresponds to the outlet bore inner diameter, and wherein the nozzle bore includes a second bore section defined by a second bore length and a variable bore diameter, and wherein a ratio of the outlet bore inner diameter at the nozzle face to the first bore length is between 0.8 and 1.1, or
   wherein the second bore section increases in diameter along the second bore section length from an end of the first bore section to the inlet bore inner diameter such that the second bore section is defined by a conical surface angle, and wherein the conical surface angle of the nozzle is within a range between 0 degrees and 25 degrees.

2. The high pressure relief valve according to claim 1 wherein the coupling feature comprises at least one tab extending radially outwardly from an outer surface of the nozzle body, and wherein the tab is received within a slot formed within the closure sleeve, and wherein the at least one retaining feature prevents the tab from being removed from the slot.

3. The high pressure relief valve according to claim 2 wherein the nozzle body includes a tapering outer surface portion that increases radially outward from the nozzle face to a downstream side of the at least one tab.

4. The high pressure relief valve according to claim 2 wherein the at least one retaining feature comprises a snap ring.

5. The high pressure relief valve according to claim 4 wherein the snap ring is received within a groove formed in the closure sleeve.

6. The high pressure relief valve according to claim 1 wherein the nozzle body includes an outer surface with a groove that receives a seal.

7. A fuel supply system incorporating:
   a fuel pump having a pump inlet and a pump outlet, the pump inlet being in fluid communication with a fuel supply;
   a metering valve receiving fuel from the fuel pump and directing the fuel to a gas turbine engine; and
   a high pressure relief valve upstream of the metering valve and downstream of the pump inlet, the high pressure relief valve being configured to move to an open position once system pressure downstream of the pump outlet exceeds a predetermined pressure level such the fuel can be returned to the pump inlet via the high pressure relief valve, and wherein the high pressure relief valve comprises
   a valve housing defining an internal bore and having a valve inlet configured to be in fluid communication with a pump outlet;
   a closure sleeve at least partially received within the internal bore, the closure sleeve comprising a sleeve body surrounding a center axis, wherein the sleeve body has an internal cavity that is enclosed at a downstream end and open at an upstream end;

a piston received within the internal cavity, wherein the internal cavity is defined in part by a piston contact surface that is defined by an inner diameter, wherein an outer surface of the piston slides against the piston contact surface;

a nozzle received within the internal bore of the valve housing, the nozzle comprising a nozzle body surrounding a center axis and defined by an overall length extending from an inlet end to an outlet end, wherein the nozzle body has a nozzle bore defined by an outlet bore inner diameter at the outlet end and an inlet bore inner diameter at the inlet end, the inlet bore inner diameter being greater than the outlet bore inner diameter, and wherein the nozzle body has a nozzle face defined at the outlet end, the nozzle face being defined between the outlet bore inner diameter and an outlet bore outer diameter spaced radially outwardly of the outlet bore inner diameter, and wherein the nozzle body includes a coupling feature held fixed relative to the nozzle body such that the coupling feature is not moveable relative to the nozzle body, and wherein the coupling feature is configured to couple the nozzle body to the closure sleeve that surrounds the outlet end;

at least one retaining feature that prevents the coupling feature from being uncoupled from the closure sleeve;

a spring assembly that biases the piston to close the outlet end, and wherein when a system pressure at the outlet end exceeds a predetermined pressure level, a spring biasing load is overcome to open the nozzle outlet to fluidly connect the nozzle to the internal cavity of the closure sleeve; and wherein the nozzle includes one or more of the following nozzle characteristics wherein a ratio of the outlet bore inner bore diameter to the outlet bore outer diameter at the nozzle face is between 0.95 and 9.98, wherein a ratio of the outlet inner bore diameter at the nozzle face to the overall length is between 0.30 and 0.25, wherein the nozzle bore includes at least a first bore section defined by a first bore length and a generally constant bore diameter that corresponds to the outlet bore inner diameter, and wherein the nozzle bore includes a second bore section defined by a second bore length and a variable bore diameter, and wherein a ratio of the outlet bore inner diameter at the nozzle face to the first bore length is between 0.8 and 1.1, or wherein the second bore section increases in diameter along the second bore section length from an end of the first bore section to the inlet bore inner diameter such that the second bore section is defined by a conical surface angle, and wherein the conical surface angle of the nozzle is within a range between 0 degrees and 25 degrees.

8. The fuel supply system according to claim 7 wherein the coupling feature comprises at least one tab extending radially outwardly from an outer surface of the nozzle body, and wherein the tab is received within a slot formed within the closure sleeve, and wherein the at least one retaining feature prevents the tab from being removed from the slot.

9. The fuel supply system according to claim 8 wherein the nozzle body includes a tapering outer surface portion that increases radially outward from the nozzle face to a downstream side of the at least one tab.

10. The fuel supply system according to claim 8 wherein the at least one retaining feature comprises a snap ring.

11. The fuel supply system according to claim 10 wherein the snap ring is received within a groove formed in the closure sleeve.

12. The fuel supply system according to claim 7 wherein the nozzle body includes an outer surface with a groove that receives a seal.

13. A method of replacing a component in a high pressure relief valve including the steps of:

removing a nozzle from a valve housing and replacing the removed nozzle with a replaced nozzle, wherein a closure sleeve is at least partially received within the valve housing and includes an internal cavity that is enclosed at a downstream end and open at an upstream end, a piston is received within the internal cavity of the closure sleeve, and wherein the nozzle comprises a nozzle body surrounding a center axis and defined by an overall length extending from an inlet end to an outlet end, wherein the nozzle body has a nozzle bore defined by an outlet bore inner diameter at the outlet end and an inlet bore inner diameter at the inlet end, the inlet bore inner diameter being greater than the outlet bore inner diameter, and wherein the nozzle body has a nozzle face defined at the outlet end, the nozzle face being defined between the outlet bore inner diameter and an outlet bore outer diameter spaced radially outwardly of the outlet bore inner diameter and wherein the nozzle body includes a coupling feature held fixed relative to the nozzle body such that the coupling feature is not moveable relative to the nozzle body, and wherein the coupling feature is configured to couple the nozzle body to the closure sleeve that surrounds the outlet end, and including at least one retaining feature that prevents the coupling feature from being uncoupled from the closure sleeve; and wherein if the nozzle is removed and replaced, the replaced nozzle has one or more of the following nozzle characteristics wherein a ratio of the outlet bore inner bore diameter to the outlet bore outer diameter at the nozzle face is between 0.95 and 9.98, wherein a ratio of the outlet inner bore diameter at the nozzle face to the overall length is between 0.30 and 0.25, wherein the nozzle bore includes at least a first bore section defined by a first bore length and a generally constant bore diameter that corresponds to the outlet bore inner diameter, and wherein the nozzle bore includes a second bore section defined by a second bore length and a variable bore diameter, and wherein a ratio of the outlet bore inner diameter at the nozzle face to the first bore length is between 0.8 and 1.1, or wherein the second bore section increases in diameter along the second bore section length from an end of the first bore section to the inlet bore inner diameter such that the second bore section is defined by a conical surface angle, and wherein the conical surface angle of the nozzle is within a range between 0 degrees and 25 degrees.

14. The method according to claim 13 wherein the coupling feature comprises at least one tab extending radially outwardly from an outer surface of the nozzle body, and wherein the tab is received within a slot formed within the closure sleeve, and wherein the at least one retaining feature prevents the tab from being removed from the slot.

15. The method according to claim 14 wherein the nozzle body includes a tapering outer surface portion that increases radially outward from the nozzle face to a downstream side of the at least one tab.

16. The method according to claim 14 wherein the at least one retaining feature comprises a snap ring.

17. The method according to claim 16 wherein the snap ring is received within a groove formed in the closure sleeve.

18. The method according to claim 13 wherein the nozzle body includes an outer surface with a groove that receives a seal.

\* \* \* \* \*